No. 656,579. Patented Aug. 21, 1900.
F. FLICH & A. FIRLINGER.
SEEDING ATTACHMENT FOR PLOWS.
(Application filed Jan. 30, 1900.)
(No Model.) 3 Sheets—Sheet 2.
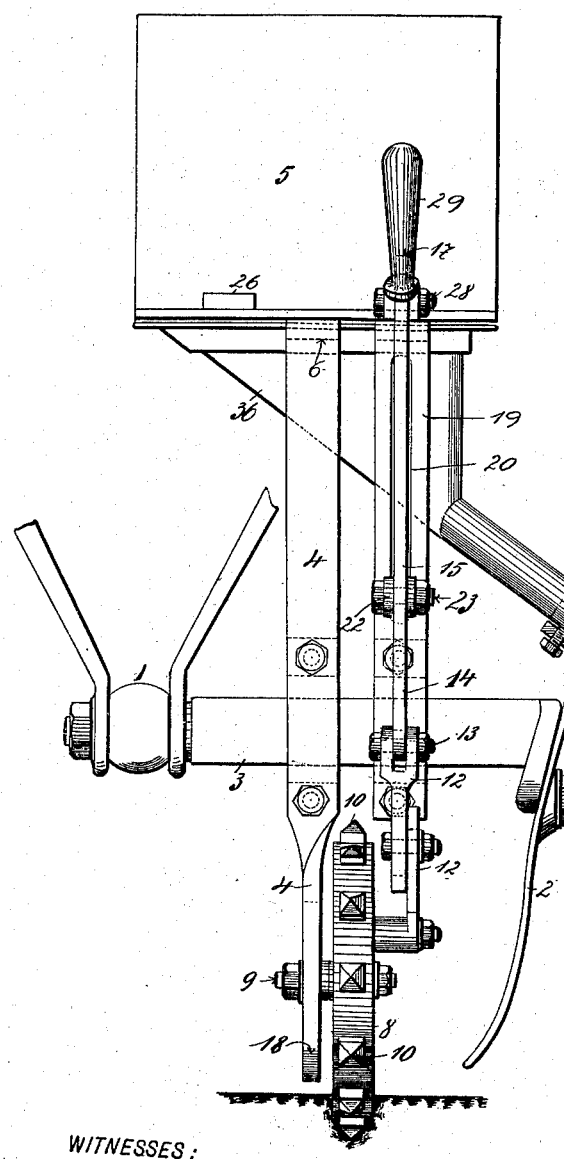
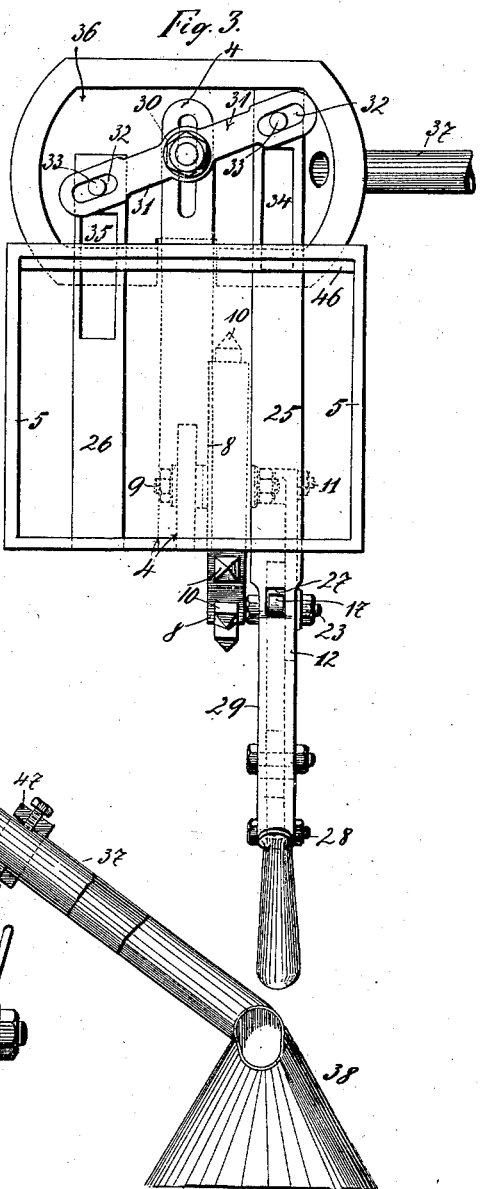
WITNESSES:
INVENTORS
Franz Flich
Anton Firlinger
BY
ATTORNEYS.

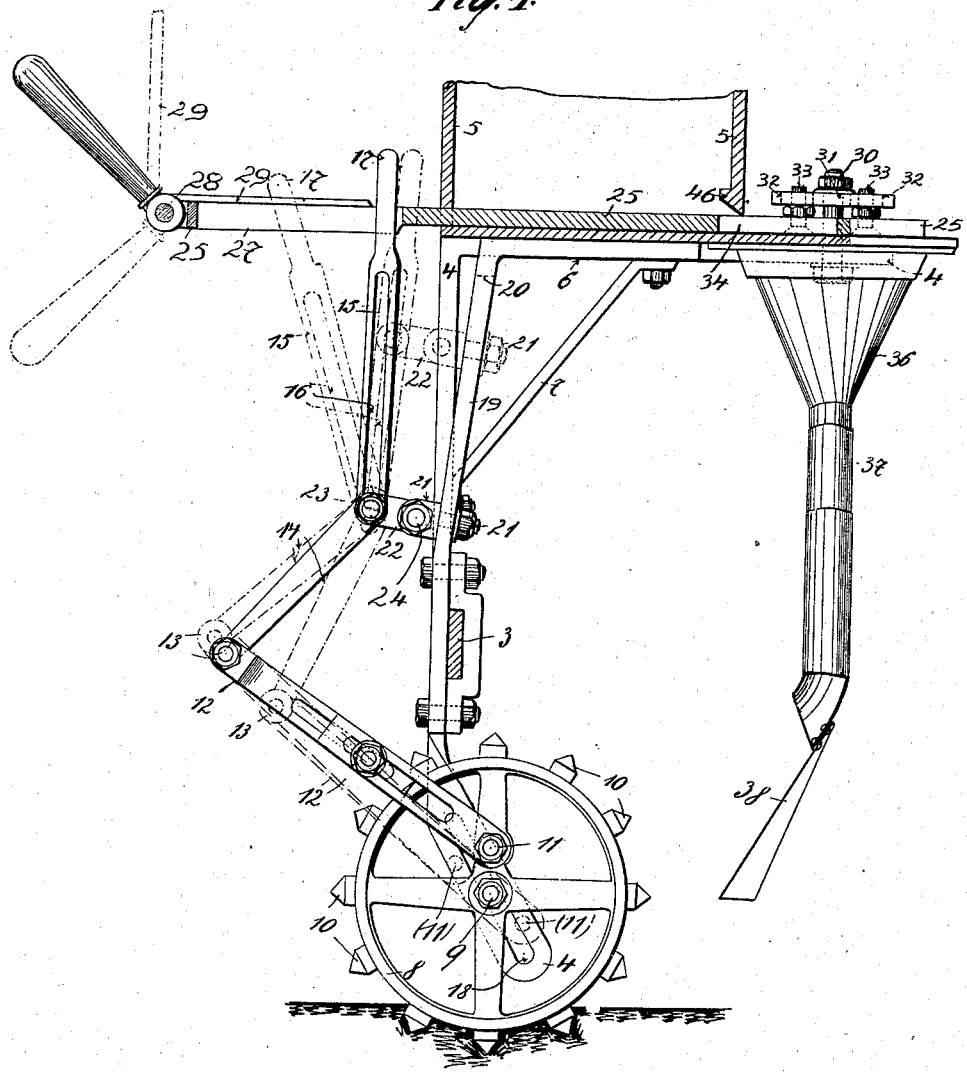

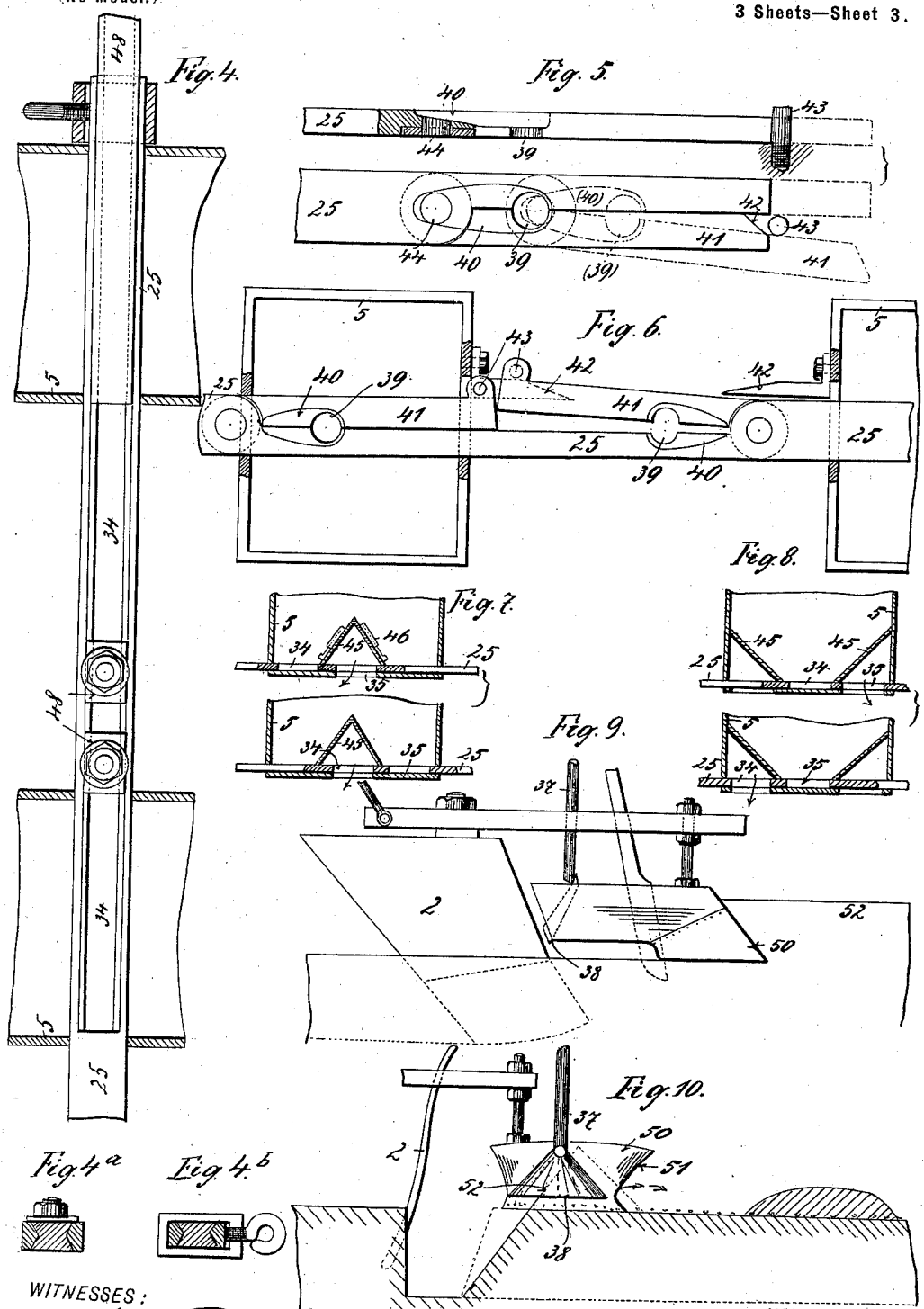

UNITED STATES PATENT OFFICE.

FRANZ FLICH AND ANTON FIRLINGER, OF NEUNKIRCHEN, AUSTRIA-HUNGARY.

SEEDING ATTACHMENT FOR PLOWS.

SPECIFICATION forming part of Letters Patent No. 656,579, dated August 21, 1900.

Application filed January 30, 1900. Serial No. 3,309. (No model.)

*To all whom it may concern:*

Be it known that we, FRANZ FLICH and ANTON FIRLINGER, citizens of the Empire of Austria-Hungary, residing at Neunkirchen, in the Province of Lower Austria, Austria-Hungary, have invented certain new and useful Improvements in Seeding Attachments for Plows, of which the following is a specification.

This invention consists in an automatically-working apparatus for sowing and planting applicable to plows of various constructions and to be used in place of the complicated and therefore costly sowing and planting machines hitherto in use. This apparatus saves much time and labor, especially to the small farmer, inasmuch as it plows and sows or plants the seed in one operation by strewing the seed on the first-leveled ground and subsequently covering it with earth. The apparatus works absolutely automatically and can be easily and quickly mounted on the plow without altering its construction.

In the accompanying drawings, which show a sowing and planting apparatus attached to a plow, Figure 1 is a side view, partly longitudinally sectioned. Fig. 2 is a rear view. Fig. 3 is a plan view. Figs. 4, 5, 6, 7, and 8 are detail plan and sectional views of modifications of the seed-carrying slide and adjuncts. Figs. 4ᵃ and 4ᵇ are transverse sections, partly in elevation, of the slides and guides therefor shown in Fig. 4. Figs. 9 and 10 show rear and side views of a peculiarly-constructed plow with planting attachment, by which the ground may be plowed and leveled and the seed sown or planted and covered with earth all in one operation, as hereinafter fully described.

Similar numerals of reference indicate corresponding parts throughout the drawings.

On a suitably-strengthened cross or bolt bar 3, Figs. 1 and 2, connecting the handles 1 with the plowshare 2, a hanger 4 is secured, which extends with its lower end nearly to the ground, the upper end being bent rectangularly. The upper horizontal arm 6 of the hanger 4, which arm may be strengthened by a brace 7, supports the seedbox 5. The lower end of the hanger 4 is forked or made with a slot 18, in which the axle 9, bearing the steering and carrying wheel 8, may be adjusted according to the height of the latter. This wheel is pressed against the ground by the weight of the machine, and therefore turns when moved forward, the cogs or spikes 10 on its rim securing a steady motion. The wheel 8 has a crank-pin 11, furnishing a pivot connection for the two-part connecting-rod 12, which is adjustable in length and secured on the shorter arm of a link-lever 14 15, the longer arm of which lever has a slot 16 and a handle-like end or extension 17. Near the hanger 4 and parallel to it there is another hanger 19, secured at one end to the bolt-bar 3 and at the other end to the seedbox 5, said hanger having a slot 20 in its upper part. In this slot the block 21 is adjustable, which block is joined by the link 22 to the link-lever 14 15, into the slot of which said link is fastened by the bolt 23. It is therefore evident that the turning of the wheel 8 will by the corresponding movement of the connecting-rod 12 cause the link-lever 14 15 and the link 22, which is connected to the block 21 by the bolt 24, to oscillate. The oscillating motion of the lever extension 17 is used to actuate the seed-slides 25. It should here be remarked that the number of the seed-slides is not limited. For instance, in Fig. 3 there is represented a type of the apparatus having two slides movable oppositely to each other. Fig. 4 shows a double-acting slide, Figs. 4ᵃ and 4ᵇ being cross-sections of the same. Fig. 5 is a front view of a single slide, partially in section and partially in plan view. In accordance with the construction of the slides the seedbox 5 is provided with internal inclined plates 45, as represented in Figs. 7 and 8, in two modifications for double-acting slides.

In Figs. 1 to 3 are shown two slides 25 26, movable longitudinally to and fro on the bottom of the seedbox. Slide 25 is elongated toward the rear and is there provided with a slot 27, in which engages the upper end 17 of the link-lever 14 15. This slot is long enough to allow the lever end 17 to move freely when desired without moving the slide 25. In order to couple the slide 25 with the lever end 17, a hinged flap 29 is located on the end of the slide, which when down in the position shown in full lines, Fig. 1, covers the slot 29 in such a manner that the lever end 17 can no longer move freely in the slide, but is forced to shift it in both directions. The slide 25 transmits its motion to the parallel slide 26 by means of a two-armed lever 31, provided with slots 32, into which pins 33 project, said lever turning on the bolt 30, which projects through an extended portion of the bottom of the seedbox 5 from the hanger 4. The slide 26 naturally has a contrary motion to the slide 25. Each slide 25 and 26 has a vertical opening 34 and 35, respectively, in which by the motion of the slides the seeds are carried from the box 5 to the funnel 36 37, through which they drop to the distributer 38 and to the ground. The dimensions of the slots 34 35 determine the quantity of the simultaneously-dropped seeds. For planting Indian corn, beets, &c., the slides 25 26 are made with a hole 39, Figs. 5 and 6, of about the size of the seeds, adjoining which there is an upwardly-shallowing tray or pocket 40, which keeps all the seeds except the one just ready to drop in the seedbox. To secure a sure dropping of the seeds, the slides are double on the forward end in such manner that a leg 41, adjoining the hole 39, can be oscillated on a connecting pivot-pin 44. The opening of the slide may be effected by fixed wedges 42 on the seedboxes and lugs 43 on the slide; but it is immaterial whether the wedges be placed on the movable part of the slide and the lugs on a suitable point on or over the funnel, or vice versa. As shown in Figs. 1 to 4, the slides 25 26 work alternately, so that while one slide is being filled the other discharges the seed into the funnel.

Instead of two slides only one may be used, as shown in Figs. 7 and 8, which can be single or double acting. In planting or when the seed is to be spread as far as possible a single slide with only one opening is sufficient. Otherwise a double one can be used, in which case the seedbox must be provided with inclined plates 45, which lead the seeds to the slide-openings 34 35.

Figs. 7 and 8 show suitable forms of the seedbox and views of the slide-openings in both end positions. Suitably constructed and arranged cut-offs or sweeps 46 prevent the crushing of the seeds. It is self-evident that double-acting slides must be provided with double devices 42 43 for opening the movable side legs 41. As shown, the distributing-funnel 37 is mounted so as to extend obliquely sideward and downward, so that the seeds may not drop into the furrow being plowed, but into the last-completed one. The pipe-sections of the funnel 37 can be made to telescope and be furnished with a clamp 47, so as to allow the distributer to be set as desired. When sowing Indian corn, where only the alternating furrows are planted, the feeding-slide is closed during the drawing of empty furrows by the closing of the flap 29, Fig. 1, dotted lines, whereby the lever extension 17 is allowed to move freely in the slot 27 without taking the slide 25 along. In order to regulate the size of the slide-openings, which are made conically smaller from the top and bottom toward the middle, suitable small slides 48, Fig. 4, are provided. By the provision of means to change the size of the steering-wheel one is enabled to change the number and by varying the position of the link-block 21 the length of the slide strokes.

Figs. 9 and 10 represent a plow with sowing attachment by which sowing or planting and covering of the seed with earth may be done simultaneously. This plow, which looks somewhat like a double-shared one, is characterized by a cover-share 50, placed before the sowing apparatus. This share being hinged somewhat higher than the main plowshare cuts through the earth mound formed in drawing the preceding furrow and levels it, so that the sowing apparatus behind can strew the seed on the evened earth. The stripping-plate 51 of the cover-share 50 is quite concave, so that the earth scraped from the mound 52 is thrown far enough sideward to cover the seed sown during the drawing of the preceding furrows. Thus a sowing-plow does triple work. First, it draws a furrow and forms the earth mound 52; second, it forms on the latter a level surface and strews the seed on it, and, third, in leveling the earth mound 52 it throws earth on the seed strewn during the drawing of the second preceding furrow. With careful plowing the earth mounds are all made of an equal height, so that the leveled mounds or ridges will be even and the seed evenly covered. By vertically adjusting the cover-share 50 the seed depth can be regulated. A field tilled in this way only needs rolling, for the apparatus has performed all the previous work of plowing, leveling, and sowing, with but very little additional labor to man or beast.

Having thus described our invention, what we claim is—

1. The herein-described apparatus, comprising a seedbox suitably supported on a steering-wheel, and provided with openings, a seed-distributer extending from the said box, a slide guided in said box and provided with an opening for registering with aforesaid opening, and means connecting the steering-wheel with said slide for causing the reciprocation of the slide, such means comprising a lever mounted on an adjustable pivot, and acting at one end of said slide, and an extensible connecting-rod between the other end of the lever and the steering-wheel, substantially as set forth.

2. The herein-described apparatus, comprising a seedbox suitably mounted on a steering-wheel, a seed-distributer extending from said box, a slide guided in the box, said box and slide having registrable openings, and the rear end of said slide having a slot, a suitably-mounted lever, one end of which enters said slot, means for connecting the lever with the steering-wheel, and means for closing said slot so that said lever may reciprocate the slide, substantially as set forth.

3. The herein-described apparatus, comprising a seedbox suitably mounted, a slide guided in said box, the box and slide having registrable openings, and said slide having a slot in its rear end, a lever, one end of which enters said slot, means for oscillating said lever, and a flap hinged to the slide and adapted to close said slot so that the lever may reciprocate the slide, substantially as set forth.

4. The herein-described apparatus, comprising a seedbox suitably supported on a steering-wheel, and provided with an opening, a seed-distributer extending from the said box, a slide guided in said box and provided with an opening for registering with aforesaid opening, said slide having a slot in its rear end, a lever mounted on an adjustable pivot, and its upper end entering said slot, a connecting-rod between the other end of said lever and the steering-wheel, and means for closing said slot so that said lever may reciprocate the slide, substantially as set forth.

In testimony that we claim the foregoing as our invention we have signed our names in presence of two subscribing witnesses.

FRANZ FLICH.
ANTON FIRLINGER.

Witnesses:
WILHELM ROEGER,
ALVESTO S. HOGUE.